Figure 1:
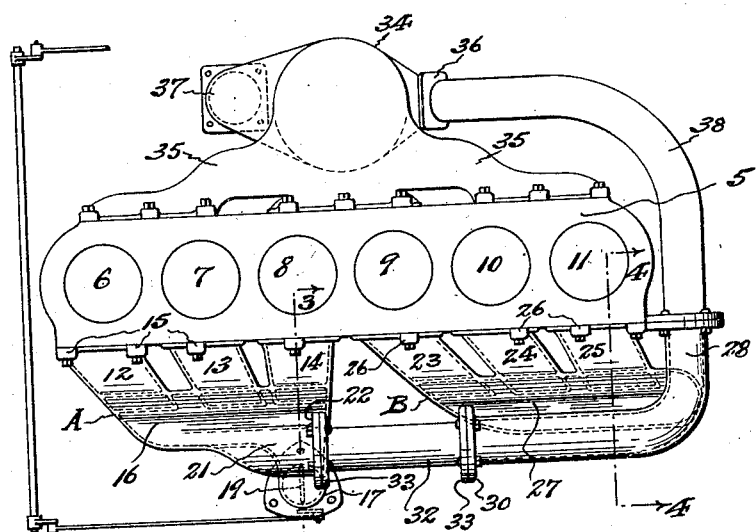

Oct. 27, 1931.    E. R. GODWARD    1,828,774
EXHAUST MANIFOLD FOR INTERNAL COMBUSTION ENGINES
Filed June 6, 1929

INVENTOR.
Ernest R. Godward
BY
George D. Richards
ATTORNEY.

Patented Oct. 27, 1931

1,828,774

UNITED STATES PATENT OFFICE

ERNEST R. GODWARD, OF NEW YORK, N. Y.

EXHAUST MANIFOLD FOR INTERNAL COMBUSTION ENGINES

Application filed June 6, 1929. Serial No. 368,745.

This invention relates, generally, to improvements in exhaust manifolds for internal combustion engines.

The invention has for its principal object to provide a novel form and construction of manifold having angularly pitched branches leading from the engine cylinder exhaust ports, which branches are also laterally inclined in the direction of exhaust gas movement so as to make juncture with a common discharge passage or conduit in a sweeping stream-line effect. By reason of the novel angular pitch and of the stream-line inclination of the branches of the manifold relative to the common discharge passage into which they lead, the speed of the movement of outgoing gases is greatly increased with the result that the scavenging of the engine combustion chambers is more completely and rapidly attained, and heat and free carbon is rapidly carried away from the valves, whereby the latter suffer less risk of carbon accumulations; at the same time, back pressure is reduced to an appreciable extent whereby a considerable increase in power is attained. Another advantage of the novel manifold structure is that it prevents the outgoing exhaust gas from giving up its heat until some distance away from the valves, while due to the enlarging section of the main passage of the manifold toward its outlet, the gas sweeping thereinto and therethrough is suddenly expanded with consequent heat loss by reason of such expansion. This latter effect assures a cooler exhaust pipe with consequent reduction of fire hazard when the engine is used for automotive or for marine work.

In its more specific aspects, this invention has for a further object to provide an exhaust manifold structure, having the advantages above referred to, which may be arranged in connection with groups of cylinders of a multi-cylinder engine, and connected with an exhaust heated vaporizer pot, all in such manner that the exhaust from one group or all of the engine cylinders may be delivered at will to the vaporizer device; and to this end the manifold structure comprises a plurality of manifolds each having outlet passages, but also having means for coupling the same in communication so that when the outlet passage of one manifold is closed by a suitable valve means, the exhaust gases discharged therethrough may be led to join the exhaust gases of the other manifold for delivery therewith to the vaporizer device, all as hereinafter more particularly set forth.

Other objects of this invention, not at this time more particularly enumerated, will be clearly understood from the following detailed description of the same.

An illustrative embodiment of this invention is shown in the accompanying drawings, in which:—

Figure 2:
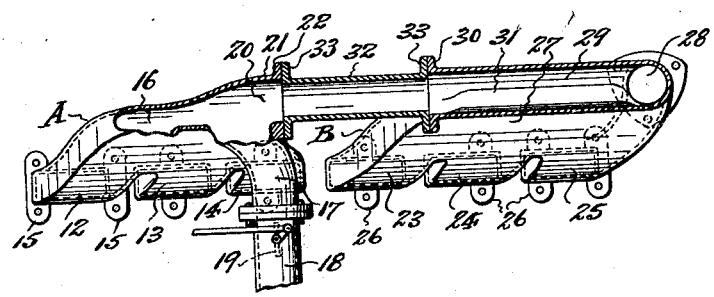
Figure 3:
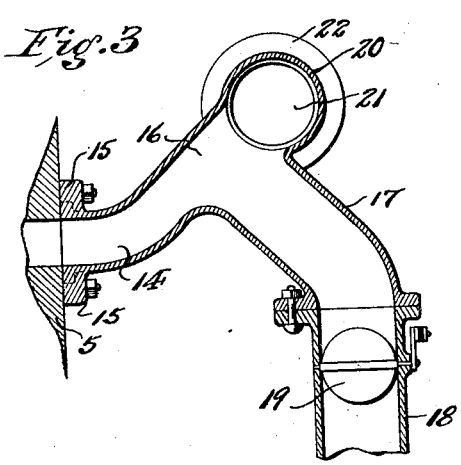
Figure 4:
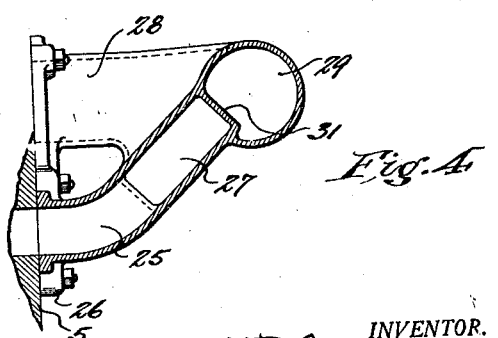

Figure 1 is a top or plan view of an engine block showing the novel manifold structure connected therewith, and also connected with a vaporizer device in accordance with the principles of this invention; Figure 2 is a front elevation of the manifold structure, with parts shown in section; Figure 3 is a transverse section, on an enlarged scale, taken on line 3—3 in Figure 1; and Figure 4 is another transverse section, also on an enlarged scale, taken on line 4—4 in Figure 1.

Similar characters of reference are employed in the above described views, to indicate corresponding parts.

Referring to the drawings, the reference character 5 indicates an engine block having six cylinders, viz; 6, 7, 8, 9, 10 and 11.

The novel manifold structure is arranged in two sections A and B. Manifold A is connected with the engine block 5 so as to serve cylinders 6, 7 and 8, while manifold B is connected with the engine block 5 so as to serve cylinders 9, 10 and 11.

Manifold A comprises the branches 12, 13 and 14, each having flanges or ears 15 for bolting to the engine block 5, so as to register respectively with the exhaust ports of cylinders 6, 7 and 8. Said branches 12, 13 and 14 are formed with an angular pitch curving from horizontal plane, and in the form shown to an ascending angular plane, preferably of approximately forty-five degrees, where they mutually join and communicate with a common discharge conduit 16. It will be understood that the said branches could be arranged in a descending angular plane if desired. The branches 12, 13 and 14 are also laterally inclined from left to right so as to eliminate abrupt angles or turns, whereby the same join the common discharge conduit 16 with a stream-line effect in the direction of the outward movement of exhaust gas therethrough. In manifold A as shown, the degree of lateral inclination of the several branches varies, the branch 12 having the greatest angular sweep and the branch 14 the least angular sweep. In this respect, however, the structure is subject to more or less change according to the design of engine block with which the manifold is to be used. The common discharge conduit 16 terminates in an outlet portion 17, which, in the form shown in the drawings, is downwardly directed and outwardly offset at a point approximately opposite the branch 14, whereby, normally, exhaust gas discharged through the latter sweeps directly through the end of the discharge conduit 16 and thence into the outlet portion 17. An exhaust pipe 18 to be led away from the engine to a desired venting point is coupled with said outlet portion 17. In the passage provided by the outlet portion and adjoining exhaust pipe 18 is arranged a shut-off valve 19, preferably in the form of a butterly valve, as shown. This valve may be manipulated to open or close the outlet portion 17, as may be desired. Arranged in communication with the up-turned top side of the common discharge conduit 16, so as to provide an outgoing passage 20 which merges with the passages of said conduit 16, is a secondary discharge conduit 21, having at its mouth a suitable flange 22. The purpose of this secondary discharge conduit 21 will presently appear.

Manifold B comprises the branches 23, 24 and 25, each having flanges or ears 26 for bolting to the engine block 5 so as to register respectively with the exhaust ports of cylinders 9, 10 and 11. Said branches 23, 24 and 25 are formed with an angular pitch curving form horizontal plane, and in the form shown to an ascending angular plane, also preferably of approximately forty-five degrees, where they mutually join and communicate with a common discharge conduit 27. It will likewise be understood that said branches could be arranged in a descending angular plane if desired. Said branches 23, 24 and 25 are also laterally inclined from left to right so as to eliminate abrupt angles or turns whereby the same join the common discharge conduit 27 with a stream-line effect in the direction of the outward movement of exhaust gas therethrough. The common discharge conduit 27 terminates in an outlet portion 28, which, in the form shown in the drawings, is rearwardly and laterally directed beyond the adjacent end of the engine block 5. Formed contiguous to the up-turned top side of the common discharge conduit 27 is a secondary discharge conduit 29, having at its rearward open end a flange 30. The interior of this secondary discharge conduit 29 is separated from the adjacent discharge conduit 27 by the top side wall 31 of the latter, but its forward end opens into communication with said outlet portion 28 thereof, of which it forms a receiving branch.

The opposed ends of the secondary discharge conduit 21 of manifold A and secondary discharge conduit 29 of manifold B are joined together by a coupling pipe or conduit 32, having flanges 33 at its ends to be respectively bolted to the flanges 22 and 30 of said conduits 21 and 29, whereby said manifolds A and B may be both joined for the delivery of the exhaust gas of all the engine cylinders through the outlet portion 28 when it is so desired.

In Figure 1 I have illustrated an exhausted heated vaporizer pot 34, which is coupled to the fuel mixture intake manifold 35 leading to the engine cylinders. This vaporizer pot 34 may be of the type shown and described in United States Patent #1,686,609, dated October 9th, 1928, in which a heating chamber is provided having an intake and outlet end. The intake end of the heating chamber of the vaporizer 34 is indicated in the instant case at 36 and the outlet end thereof at 37. An exhaust pipe 38 is coupled to and between the intake 36 and the outlet portion 28 of manifold B, whereby exhaust gases discharged from the engine cylinders may be led to the heating chamber of the vaporizer pot 34, to be thence discharged to any desired venting point.

In the operation of the vaporizer pot 34, it is often desirable to utilize the available heat of the exhaust gas discharged from all of the engine cylinders, while at other times only a part of the exhaust gas may be desired to be used under conditions where less heat is required at the vaporizer pot. By the novel arrangement of manifolds A and B, the exhaust gas from all the engine cylinders may be delivered to the vaporizer pot, or, at will, only the exhaust gas from engine cylinders 9, 10 and 11. In the former case, the valve 19 is closed to shut off the direct outlet portion 17 of manifold A, whereupon the exhaust gas discharged from engine cylinders 9, 10 and 11 is diverted from said direct outlet portion 17 and is caused to flow out through secondary discharge conduit 21, and thence through coupling pipe 32 and through secondary discharge conduit 29 of manifold B into the outlet portion 28 of the latter to join the stream of exhaust gas discharged from engine cylinders 12, 13 and 14, to pass therethrough from manifold B, whence the combined output of both manifolds A and B is directed through the pipe 38 for delivery through the heating chamber of the vaporizer pot 34. When it is desired to utilize less heat at the vaporizer pot 34, the valve 19 is opened to permit the direct venting of gases discharged from engine cylinders 9, 10 and 11, so that only the exhaust gas from engine cylinders 12, 13 and 14 pass to the vaporizer pot 34.

In its broader aspects, the invention is independent of the divisional form of the manifold structure as related to the furnishing of exhaust gas as a heating medium for a vaporizer pot; and from the broad standpoint the invention relates to the arrangement and form of exhaust manifold having branches leading from the engine exhaust ports which are pitched angularly up or down as the case may be, and laterally inclined to provide a smooth streamline conjunction with a common discharge passage. As to such basic construction it makes no difference whether the same is embodied in a two part manifold or a single unitary manifold serving all the engine cylinders, and furthermore, these novel features of manifold construction may be embodied in a structure adapted to serve an internal combustion engine regardless of the number of cylinders possessed by the latter. It has been found that the angular pitch or inclination of the manifold branches arranged to lead into an off-set common discharge conduit operates to accelerate the exhaust gas movement and more rapidly scavenge the cylinders when the exhaust valves open, while at the same time more effectively sweeping away free carbon; furthermore, the exhaust gas is initially moved a greater distance away from the valves before giving up its heat; the accelerated movement of the gas, the resultant more effective scavenging of the cylinders, and the natural sweeping outlet path afforded by the streamline arrangement of branches and discharge conduit all tend to reduce back pressure to a marked degree; thus effectively increasing the power factors of the engine.

In addition to the basic structural features above referred to and applicable to manifolds generally, the invention in its more specific aspects, includes the divisional or two-part form of manifold structure whereby the exhaust gas output of the engine may be used in whole or in part as a heating medium for various purposes, all as hereinafter claimed.

It will be understood that many changes could be made in the above described construction and many apparently widely different embodiments of this invention could be made without departing from the scope thereof, consequently it is intended that all matter contained in the above description or shown in the accompanying drawings shall be interpreted as illustrative and not in a limiting sense.

What is claimed is:—

1. An exhaust manifold for internal combustion engines, comprising branches to connect respectively with the engine cylinder exhaust ports, a common discharge conduit communicating with the outer ends of said branches, said branches being pitched toward said discharge conduit at an angle and also laterally inclined in the direction of the outlet from said discharge conduit so that the passages of said branches and conduit merge with streamline effect, and said conduit having an internal capacity in excess of that of the several branches.

2. An internal combustion engine exhaust manifold structure arranged to deliver the gases discharged therethrough for use as a heating medium in fuel treating apparatus serving the engine, comprising a manifold member connected in communication with certain of the engine cylinder exhaust ports, a second manifold member connected in communication with other of the engine cylinder exhaust ports, said first manifold member having an outlet portion adapted for direct connection with the fuel treating apparatus to conduct exhaust gas thereto, said second manifold member also having an outlet portion provided with a manipulatable valve for opening or closing the same, said manifold members each having secondary discharge conduits, means for connecting the latter in communication, and said secondary conduit of said first manifold member being arranged to communicate with said outlet portion thereof, all whereby when the outlet portion of said second manifold member is closed the gas discharged therefrom may flow through said secondary discharge conduits to join the gas discharged from said first manifold member.

3. An internal combustion engine exhaust manifold structure arranged to deliver the gases discharged therethrough for use as a heating medium in fuel treating apparatus serving the engine, comprising a manifold member connected in communication with certain of the engine cylinder exhaust ports, a second manifold member connected in communication with other of the engine cylinder exhaust ports, each manifold member comprising branches to connect with engine cylinder exhaust ports, said branches being angularly inclined outwardly from said exhaust ports, each manifold having a common discharge conduit which the outer ends of the branches thereof communicate, said first manifold member having an outlet portion leading from its discharge conduit adapted for direct connection with the fuel treating apparatus to conduct exhaust gas thereto, said second manifold member also having an outlet portion leading from its discharge conduit provided with a manipulatable valve for opening or closing the same, said first manifold having a secondary discharge conduit independent of the main discharge conduit thereof but communicating with the outlet portion leading from the latter, said second manifold having a secondary discharge conduit in communication with the main discharge conduit thereof, and means for connecting said secondary discharge conduits in communication.

4. An internal combustion engine exhaust manifold structure arranged to deliver the gases discharged therethrough for use as a heating medium in fuel treating apparatus serving the engine, comprising a manifold member connected in communication with certain of the engine cylinder exhaust ports, a secondary manifold member connected in communication with other of the engine cylinder exhaust ports, each manifold member comprising branches to connect with engine cylinder exhaust ports, said branches being inclined upwardly and outwardly from said exhaust ports, each manifold having a common discharge conduit with which the outer ends of the branches thereof communicate, the branches of each manifold member being also laterally inclined in the direction of the outlets of the discharge conduits so that the passages of said branches and conduits merge with streamline effect, said first manifold member having an outlet portion leading from its discharge conduit adapted for direct connection with the fuel treating apparatus to conduct exhaust gas thereto, said second manifold member also having an outlet portion leading from its discharge conduit provided with a manipulatable valve for opening or closing the same, said first manifold having a secondary discharge conduit independent of the main discharge conduit thereof but communicating with the outlet portion leading from the latter, said second manifold having a secondary discharge conduit in communication with the main discharge conduit thereof, and means for connecting said secondary discharge conduits in communication.

In testimony that I claim the invention set forth above I have hereunto set my hand this 20th day of May, 1929.

ERNEST R. GODWARD.